United States Patent [19]

Hopkins et al.

[11] 4,017,675
[45] Apr. 12, 1977

[54] JUNCTION BOX FOR HIGH VOLTAGE GAS INSULATED CONDUCTORS

[75] Inventors: Melvyn D. Hopkins, Pittsburgh; Charles B. Wolf, Irwin, both of Pa.

[73] Assignee: Westinghouse Electric Corporation, Pittsburgh, Pa.

[22] Filed: June 6, 1975

[21] Appl. No.: 584,430

[52] U.S. Cl. .............................. 174/21 C; 174/28; 174/70 B; 174/71 C
[51] Int. Cl.² ......................................... H01B 9/04
[58] Field of Search .......... 174/21 R, 21 C, 21 CA, 174/21 JC, 21 JR, 28, 71 R, 71 B, 71 C, 70 B; 285/133 R, 179, 286

[56] References Cited

UNITED STATES PATENTS

| | | | |
|---|---|---|---|
| 3,546,356 | 12/1970 | Graybill | 174/21 C |
| 3,585,271 | 6/1971 | Reynolds et al. | 174/21 CA |
| 3,792,187 | 2/1974 | Depcrymski | 174/21 C |
| 3,829,642 | 8/1974 | Graybill | 174/71 R |

*Primary Examiner*—Arthur T. Grimley
*Attorney, Agent, or Firm*—M. S. Yatsko

[57] ABSTRACT

Method and apparatus for forming a joint in a high voltage gas insulated electrical system wherein an outer spherical joint member surrounds an inner spherical joint member which is supported from only one of the inner housing conductors. The inner housing conductor which supports the inner sphere is supported where it extends into the outer housing sphere from a circular insulating member. The circulating insulating spacer and support is rigidly connected to a flanged opening formed on the outer housing sphere. The inner sphere which is rigidly supported is provided with a plurality of sliding contact openings for engaging other inner conductors of the additional bus sections to be joined. The outer spherical housing is formed from two hemispheres each of which has an opening formed therein. The plane defined by the opening into the hemisphere is transverse to the plane defined by the free ends of the hemisphere. Thus when the hemispheres are joined to form the outer housing sphere by relatively positioning the hemisphere angular variability can be obtained. That is, when the hemispheres are positioned to define a sphere if they are rotated relative to one another the angle, defined by the center line radii of the openings, changes. This construction permits a few number of basic hemispherical shaped parts to be utilized to produce junction boxes accommodating numerous angular variations between the bus conductors to be joined.

7 Claims, 5 Drawing Figures

JUNCTION BOX FOR HIGH VOLTAGE GAS INSULATED CONDUCTORS

BACKGROUND OF THE INVENTION

1. Field of the Invention:

The present invention relates to high voltage gas insulated conducting systems and more particularly to a junction box construction of a relatively simple nature which permits a simplified construction for joining high voltage gas insulated conductors.

2. Description of the Prior Art:

A gas insulated bus system is normally provided with an inner conductor surrounded by a pressurized insulating gas such as sulfur hexafluoride, (SF-6), and a coaxial outer sheath or housing which serves as a container for the insulating gas and provides a ground plane. In constructing a gas insulated substation the bus conductors and the associated housing must be adaptable to make many bends and also provides for T-shaped connections when necessary. Generally, to keep the electric field density at a minimum, these bends or junctions are made within a spherical shaped shell which is larger in diameter than the bus housing. In the center of this shell is located a smaller sphere which provides for connections of the main conductor, and also serves to keep the field density at a low level.

U.S. Pat. No. 3,546,356 illustrates a construction of a typical prior art dual sphere joint. In this construction a continuous outer housing sphere is formed and the angular difference between the conductors to be joined is obtained by cutting or machining appropriate openings into the outer sphere. Cutting or machining the openings in the formed sphere is more expensive and difficult than forming the openings in the individual hemispheres which are later joined. The inner conductors are permanently joined to the inner sphere. This construction of joint is relatively expensive and difficult to manufacture. The inner conductors are permanently joined to the inner sphere and cannot be removed. Another problem with this construction is that the insulating spacers and supports for the inner conductors are not rigidly joined to the housing therefore more than one insulating spacer is required in close proximity to the joints.

In another prior art construction of high voltage gas insulated bus the junction box is formed from a continuous casting. This construction does not permit angular variability when necessary. In the prior art apparatus utilizing this construction the inner spherical member is supported by a separate stand-off insulator disposed within the spherical joint. A connection to the inner spherical member can thus not be made where the insulator is located.

It is desirable to have a high voltage gas insulated bus joint which can be fabricated from a few number of relatively inexpensive parts and still provide angular variability between the various conductors when necessary.

SUMMARY OF THE INVENTION

A junction box for a high voltage gas insulated system is provided which is constructed from a few basic hemispherically shaped parts which by proper positioning can accommodate a wide variety of angular variability between the conductors to be joined. Necessary openings are formed in individual hemispheres which are later joined to form the outer sphere housing. The outer shell of the junction box is formed from the two hemispheres each having zero, one or two flared openings. The plane defined by any opening in the hemisphere extends transverse to the plane defined by the edge of the hemisphere. Thus when two hemispheres are positioned, edge to edge, to define a sphere by relative rotation of the hemispheres angular variability between the openings extending into the sphere can be obtained.

The outer spherical housings thus formed can be constructed with flanges connected to the various flared openings. The flanges can be used for making connections to the housings of the various gas insulated systems to be joined. An end portion of the inner conductors of the bus sections to be joined extend within the outer spherical portion of the junction box. One of the inner conductors extending into the spherical housing has an inner smaller diameter spherical member rigidly attached to the end thereof, by suitable means such as welding, brazing, or the like. This same inner conductor also has rigidly attached to it a circular insulating member which serves to position the inner sphere properly and to support the inner coaxial conducting bus. This inner conductor sphere is thus supported internal of the outer spherical housing member. Inner conductors to which the smaller diameter sphere is attached is supported at its entrance into the spherical housing by a circular insulator which is rigidly connected to the flanged opening on assembly, by means of the clamping action of the flanges of the junction box and mating outer bus. By rigidly connecting this circular insulator only one insulator is required for rigidly supporting the inner sphere. Additional openings are formed in the inner sphere within which are disposed sliding contacts for making electrical connection to the inner conductors of joining sections. The inner conductors of the joining sections are thus inserted into the openings of the inner sphere and make electrical contact therewith. These other conductors are not rigidly connected to the inner sphere and thus can be easily removed when desired. Likewise since these conductors are not rigidly joined some slight relative movement is permitted to accommodate movement or thermal expansion of the inner conductors. Normally one end of an inner conductor is rigidly fixed for positioning purposes, and the other end is free to move within a sliding contact joint to allow for thermal expansion of that section of inner bus. The inner sphere is firmly attached only to one end of the inner conductors with which good electrical contact is maintained as well as making electrical contact with any other electrical conductor which may be plugged into the inner sphere. The inner sphere has openings at the necessary locations with internal spring type contacts for making good electrical connection. The inner sphere may be machined from solid material, cast, or fabricated in any other well-known manner. This disclosed construction permits for an easy and simplified assembly of a gas insulated electrical conductor joint.

It is an object of this invention to teach a method for constructing the outer housing of a gas insulated bus joint wherein simplified hemispherical shaped parts can be connected together to provide a junction box having a wide variety of angular variability.

It is another object of this invention to teach a junction box assembly wherein the inner conductors can be easily removed or inserted during assembly and only one circular insulator is required for supporting the conductors within the joint housing.

BRIEF DESCRIPTION OF THE DRAWINGS

For a better understanding of the invention reference may be had to the preferred embodiment, exemplary of the invention, shown in the accompanying drawings in which.

DESCRIPTION OF THE PREFERRED EMBODIMENTS

Figure 5:
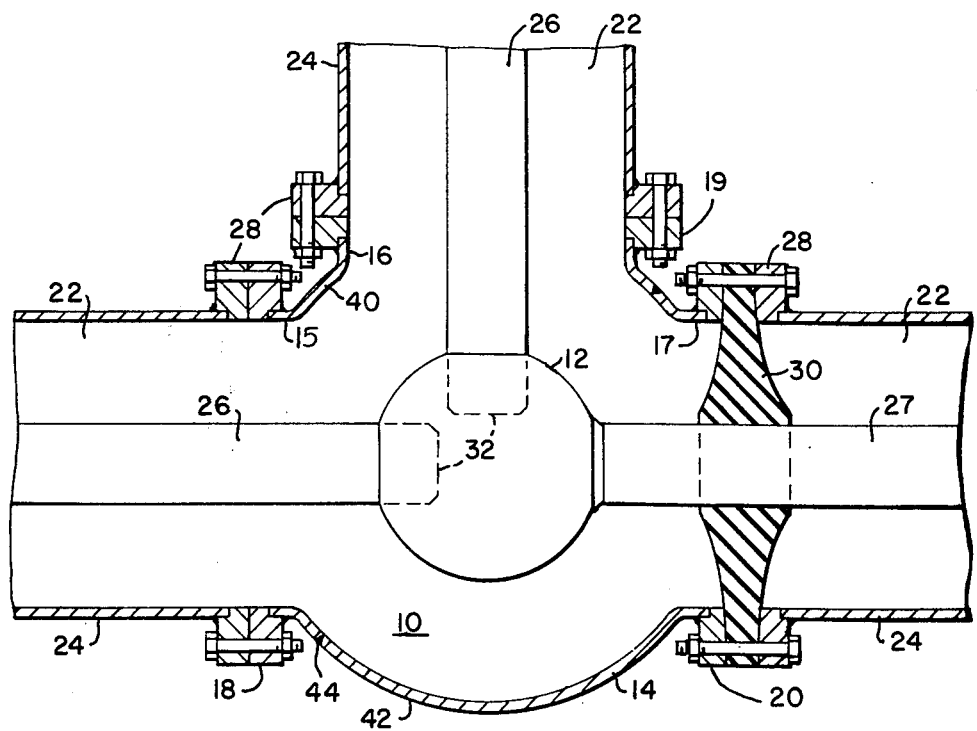

Referring now to the drawings and FIG. 5 in particular, there is shown a high voltage junction box assembly 10 utilizing the teaching of the present invention. Junction box 10 is formed with an inner sphere 12 disposed within an outer housing sphere 14. Inner sphere 12 is disposed within the confines of housing sphere 14. A plurality of openings 15, 16 and 17 are formed into outer sphere 14. Flanges 18, 19 and 20 are provided for connecting to the bus structures to be joined. The bus structures 22 to be joined comprise an outer housing or sheath 24 which surrounds an inner conductor 26,27. The inner main conductor 26,27 is formed coaxially with the housing 24. An insulating gas, such as SF-6, is disposed under pressure between the main conductor 26,27 and the housing 24. This insulating gas provides a high voltage withstand level which permits conductors 26,27 to be operated satisfactorily at high potential. Flanges 28 are formed at the ends of the housing members 24 for connection to the high voltage junction box 10.

Inner sphere 12 is rigidly and permanently connected to inner conductor 27. Inner conductor 27 is supported where it enters spherical housing 14 by a circular insulating spacer and support 30. This spacer and support 30 is rigidly attached to inner conductor 27 and is held between flanges 20 and 28. Inner sphere 12 is thus securely positioned within housing sphere 14. Inner sphere 12 has a plurality of openings 32 formed therein for receiving the free ends of conductors 26. The openings 32 formed in inner sphere 12 are equipped with spring biased contact members to make sliding contact with conductors 26 inserted therein. Thus some relative movement of conductors 26 is permitted. This also permits conductors 26 to be easily disengaged from inner sphere 12 when desired. Since spacer 30 is rigidly held in place only one spacer 30 is required for properly supporting inner sphere 12. Utilizing this construction no insulating support is required within housing sphere 14. The bolted and plug-in joints of junction box 10 permit easy assembly and disassembly. Outer sphere 14 is formed from two hemispheres 40 and 42 which are joined together at seam 44 by suitable means such as welding.

Figure 1:
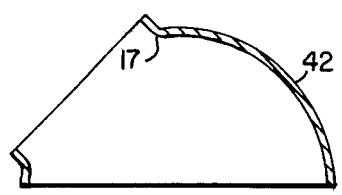
FIG. 1 illustrates a basic hemispherically shaped part formed in accordance with the teaching of the present invention.
Figure 2:
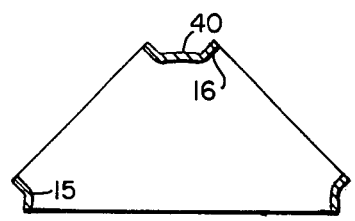
FIG. 2 is a part similar to FIG. 1 but having two openings formed therein.
Figure 3:
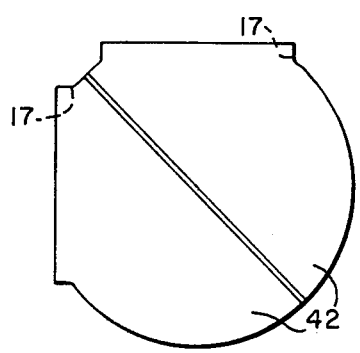
FIG. 3 is an illustration of two of the hemispherical parts shown in FIG. 1 oriented to have an angular difference between the openings of approximately 90°.
Figure 4:
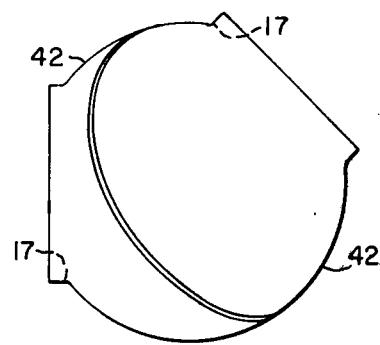
FIG. 4 is a view of the two parts illustrated in FIG. 3 but being relatively rotated to provide an angular difference between the openings of approximately 135°; and, FIG. 5 is a section view of a junction box assembly utilizing the teaching of the present invention.

Hemispheres 40 and 42, as shown in FIGS. 1 and 2, can be formed by any suitable method such as spinning, drawing or casting. Openings 15, 16 and 17 formed in hemispheres 40 and 42 can have flanges formed at the ends thereof or be direct welded to the housing structures 24 of the sections to be joined. As can be seen in FIGS. 1 and 2 the planes defined by the opening 15, 16 or 17 into the hemisphere 40 or 42 is transverse to the plane defined by the free edge of the hemisphere 40 or 42. For hemispheres 40 and 42 the angle between the opening plane and the edge plane is selected at 45°. This permits the hemispheres when assembled to be adjusted for angular variation between 90° and 180° in the conductors to be joined. This can be clearly seen in FIGS. 3 and 4 where two hemispheres 42 are joined to form the outer housing sphere 14. In FIG. 3 the hemispheres 42 are disposed so that the conductors entering opening 17 would intersect at approximately 90°. For the joint shown in FIG. 4, the hemispheres 42 have been relatively rotated so that the openings 17 are offset by a relatively larger angle. Thus it can be seen that hemispheres having openings formed therein, which are formed during manufacturing, can be joined when properly aligned to adapt to receive conductors oriented at different angles. Thus a few stock hemispheres can be assembled to provide junction boxes which can accommodate conductors with numerous angle differences.

We claim:
1. A junction box for a high voltage gas insulated system comprising:
   a first hemispherically shaped member having an opening formed therein;
   a second hemispherically shaped member having an opening formed therein joined to said first hemispherically shaped member to define a spherically shaped cavity;
   a first elongated conductor insulated from said first hemispherically shaped member and said second hemispherically shaped member having one end projecting through the opening in said second hemispherically shaped member;
   a circular insulating support rigidly joined to said first elongated conductor to rigidly support and position said first elongated conductor;
   an electrically conducting inner sphere permanently and rigidly joined to the end of said first elongated conductor within the spherical cavity defined by said first hemispherically shaped member and said second hemispherically shaped member and having a sliding contact opening formed therein, said inner sphere being in electrical contact with said first elongated conductor; and
   a second elongated conductor projecting through the opening in said first hemispherically shaped member and engaging the slidable contact opening formed in said inner sphere, said second elongated conductor being in electrical contact with said inner sphere to make electrical contact with said first elongated conductor.

2. A junction box for a high voltage gas insulated system as claimed in claim 1 wherein the openings formed in said first hemispherically shaped member and said second hemispherically shaped member have flanged openings formed thereon; and,
   said circular insulating spacer is rigidly bolted to one of said flanges.

3. A junction box as claimed in claim 2 wherein said flanged portions are disposed at an angle with respect to the edge of the associated hemispherically shaped member.

4. A junction box for connecting two or more high voltage conductors each formed with an elongated inner conductor disposed coaxially within an outer housing and being electrically insulated from the outer housing by a pressurized insulating gas between the inner conductor and the outer housing, the outer housings each having a flange at one end thereof, said junction box comprising:
- an outer sphere having a plurality of flanged openings formed therein, said outer housing flanges being secured to said outer sphere flanges to connect said outer housings to said outer sphere;
- a circular insulator rigidly attached to one of said conductors and supported by being disposed between the flange of one of said outer housings and the outer sphere flange to which it is secured, said insulator supporting and positioning an end portion of one of said inner conductors within the outer sphere; and
- an electrically conducting inner sphere disposed within said outer sphere and rigidly connected to, supported by, and in electrical contact with, said inner conductor rigidly attached to said circular insulator;
- said inner sphere having a sliding contact opening aligned with one of the openings in said outer sphere to which another of said outer housings is secured, said contact opening slidingly receiving therein one of said inner conductors and in electrical contact therewith.

5. A junction box as claimed in claim 4 wherein said inner sphere has a plurality of slidable contact openings formed therein.

6. A junction box as claimed in claim 4 wherein said outer sphere comprises:
- a first hemisphere having an opening formed therein which defines a plane transverse to the plane defined by the edge of said first hemisphere; and
- a second hemisphere having an opening formed therein which defines a plane which is transverse to the plane defined by the edge of said second hemisphere.

7. A junction box as claimed in claim 6 wherein the opening formed in said first hemisphere is formed around a center line radius extending at an angle 45° from the center point of the plane defined by the edge of said hemisphere; and,
- the opening formed in said second hemisphere is formed around a center line radius extending at an angle of 45° from the center point of the plane defined by the free edge of said second hemisphere.

* * * * *